Patented Apr. 20, 1948

2,439,791

UNITED STATES PATENT OFFICE 2,439,791

PROCESS FOR FERMENTING CARBOHYDRATES TO BUTANOL AND ACETONE

Samuel C. Beesch, Philadelphia, Pa., assignor to Publicker Industries Inc., a corporation of Pennsylvania No Drawing. Application January 13, 1945, Serial No. 572,741

4 Claims. (Cl. 195—44)

The present invention relates to bacterial fermentations and it relates more particularly to the production of butyl alcohol and other substances by the bacterial fermentation of carbohydrate mashes.

An object of the present invention is to provide a new and improved process for the production of butyl alcohol and other substances by bacterial fermentation. Another object of the present invention is to provide for fermentation of carbohydrate mashes by a certain newly discovered organism, to be hereinafter described, which gives higher ratios of butyl alcohol than are ordinarily obtainable by use of organisms heretofore employed. Still another object of the present invention to to ferment carbohydrates, including sugars and starches, by means of a certain newly discovered organism which gives relatively high ratios of butyl alcohol and correspondingly lower ratios of acetone and other products.

Other objects and advantages of the present invention will be apparent in the following detailed description and appended claims.

It is well known in the art that carbohydrate solutions or mashes can be fermented by various bacteria to produce butyl alcohol and other substances, such as acetone and ethyl alcohol. The organisms heretofore employed have, however, produced relatively large proportions of acetone which is commercially less desirable than butyl alcohol.

I have found that, employing my newly-discovered and isolated organism to be hereinafter described, I am able to obtain relatively high proportions of butyl alcohol and correspondingly lower proportions of acetone and other commercially less desirable products.

I have found further that my newly-discovered and isolated organism will produce relatively high proportions of butyl alcohol not only from sugars, such as blackstrap molasses, invert molasses, dextrose and sucrose, but also from other carbohydrates, such as corn mash, soluble starch, etc.

My newly-discovered and isolated organism, which I have named *Clostridium saccharo acetoperbutylicum*, will be described hereinbelow using the Descriptive Chart of the Society of American Bacteriologists for facility of identification.

TABLE

Name: *Clostridium saccharo acetoperbutylicum*
Source: Isolated from corn husk

I. MORPHOLOGY

1. Vegetative cells:
   Medium used: potato glucose medium (300 grams potato moist weight, 10 grams glucose, 1 gram ammonium sulfate, 3 grams calcium carbonate per liter).
   Incubation: 24 hours at 30° C.
   Stain used: nigrosin without heat.
   Form: short and long rods.
   Arrangements: single and chains and pairs.
   Usual limits of lengths: 2.3–12.8 microns; of diameter: 0.7 to 3.8 microns.
   Size of majority: 5.3 by 1.6 microns.
   Ends: rounded.

2. Sporangia: present.
   Medium used: potato glucose, medium of.
   Incubation: 36 hours at 30° C.
   Stain used: nigrosin without heat.
   Form: splindled and clavate.

3. Endospores: present.
   Medium used: potato glucose medium.
   Incubation: 72 hours at 30° C.
   Stain used: nigrosin without heat.
   Location of endospores: subterminal to terminal.
   Form: cylindrical with rounded ends, some oval.
   Usual limits of length: 1.6–3.8 microns; of diameter: 1.0–1.7 microns.
   Size of majority: 2.6 x 1.1 microns.

4. Motility:
   Medium used: glucose broth (5 grams peptone, 3 grams beef extract, 10 grams glucose per liter).
   Incubation: 20 hours at 30° C.
   Motility: motile.
   Medium used: 4% invert sugar molasses mash, 0.3% $P_2O_5$, 4% $(NH_4)_2SO_4$, 5% $CaCO_3$ on the sugar.
   Incubation: 20 hours at 30° C.
   Motility: highly motile.

5. Flagella: present.
   Medium used: molasses mash (sugar, 40 gram calculated as sucrose in the form of Cuban invert molasses), ammonium sulfate 2.2 grams, calcium carbonate 2.4 grams, and calcium acid phosphate 0.13 gram per liter.
   Stain used: Loeffler's flagella stain.
   Attachment: Peritrichous.

6. Irregular forms: present.
   Medium used: potato glucose medium.
   Incubation: 72 hours at 30° C.

7. Staining reactions:
   (a) Gram stain:
       Medium used: potato glucose medium.
       Incubation: 24 hours at 30° C.
       Stain used: Kopeloff-Beerman modification.
       Stain: positive—variable.
   (b) Iodine stain:
       Medium used: nutrient agar.
       Incubation: 48 hours at 30° C.
       Granulose: positive.

II. CULTURAL CHARACTERISTICS

1. Agar colonies:
   Medium used: nutrient agar.
   Incubation: 48 hours at 30° C.
   Form: circular to irregular.
   Surface: rough and smooth.
   Edge: entire and lobar-lobulate.
   Elevation: convex.
   Optical characteristics: translucent to opaque.

2. Agar stroke:
   Medium used: nutrient agar.
   Incubation: 96 hours at 30° C. anaerobically.
   Growth: abundant.
   Form: scattered to spreading.
   Luster: glistening.
   Chromogenesis: none to light cream.
   Odor: butylic.
   Consistency: viscid.
   Change in color of medium: none.

3. Nutrient broth:
   Medium: nutrient broth (5 grams peptone, 3 grams beef extract per liter).
   Incubation: 30° C. for 24 hours.
   Surface growth: none.
   Clouding: none.
   Odor: none.

4. Gelatin stab:
   Medium used: nutrient gelatin (gelatin 150 grams, glucose 10 grams, peptone 5 grams, beef extract 3 grams).
   Incubation: 12 days at 24° C.
   Growth: along line of puncture.
   Line of puncture: growth and gas bubbles.
   Liquefaction: yes.
   Change in color of medium: none.

5. Potato stroke:
   Medium: sterilized potato slant.
   Incubation: 96 hours at 30° C. anaerobically.
   Growth: abundant.
   Form: spreading.
   Luster: glistening.
   Chromogenesis: none to light cream.
   Odor: butylic.
   Consistency: viscid.
   Change in medium: some liquefactions.

III. PHYSIOLOGICAL CHARACTERISTICS

1. Temperature relations:
   Optimum fermentation temperature: 29–31° C.

2. Relation to reaction of medium:
   Optimum final pH 5.5–6.3.

3. Chromogenesis:
   Nutrient agar: none to light cream.
   Nutrient gelatin: none.
   Potato: none to light cream.

4. Production of indole:
   Medium used: glucose tryptophane (glucose 25 grams, tryptophane 1.0 gram per liter).
   Incubation: 96 hours at 30° C.
   Test used: p-dimethylaminobenzaldehyde.
   Indole: absent.

5. Production of hydrogen sulphide:
   Medium used: lead acetate agar (agar 15 grams, bactotryptone 20 grams, glucose 10 grams, lead acetate 0.2 gram per liter).
   Incubation: 72 hours at 30° C. absent or present in traces.

6. Relation to oxygen:
   (a) Medium used: nutrient agar.
       Incubation: 48 hours at 30° C.
       Growth: (aerobic incubation) absent.
       Growth: (anaerobic incubation) abundant.
   (b) Medium used: potato glucose medium in deep tubes.
       Incubation: 24 hours at 30° C.
       Growth: (aerobic incubation) abundant.
       Growth: (anaerobic incubation) abundant.

7. Litmus milk:
   Incubation: 30° C.
   Reaction: (3 days) acid.
   Curd: (15 days) acid curd.
   Peptonization: (15 days) slight.
   Reduction of litmus: (1 day) reduced.

8. Nitrate reduction:
   Medium: 8% potato, 1% glucose, 0.1% $KNO_3$
   Incubation: 1 day to 4 days.
   Test used: a naphthylamine sulfanilic acid.
   Reduction: none.

9. Fermentation reactions:
   (a) Acid and gas production:
       Medium used: nutrient broth plus 10 grams of carbohydrate or alcohol per liter.

| Carbohydrate or alcohol | Acid production | Gas production 72 hr. |
|---|---|---|
| Trehalose | − | − |
| Inositol | − | − |
| Arabinose | + | + |
| Rhamnose | − | − |
| Xylose | + | + |
| Glucose | + | + |
| Fructose | + | + |
| Galactose | + | + |
| Mannose | + | + |
| Lactose | + | + |
| Sucrose | + | + |
| Maltose | + | + |
| Raffinose | + | + |
| Melezitose | + | + |
| Corn Starch | + | + |
| Soluble Starch | + | + |
| Inulin | + | + |
| Glycogen | + | + |
| Glycerol | − | − |
| Erythritol | − | − |
| Mannitol | − | − |
| Sorbitol | − | − |
| Dulcitol | − | − |
| Salicin | + | + |
| Alpha-methyl glucoside | + | + |
| Melebiose | + | + |
| Esculin | − | − |
| Dextrin | + | + |

(b) Soluble starch fermentation:
   Medium used: soluble starch 50 grams, peptone 5 grams, beef extract 3 grams, ammonium sulfate 1 gram, and calcium carbonate 4 grams per liter.
   Yield range: 25–28%.
   Average yield: 27%.
(c) Nutrient corn mash fermentation:
   Medium used: corn mash 70 grams, ammonium sulphate 3 grams and calcium carbonate 4 grams per liter.
   Yield range: 28.–29.5% of the starch.
   Average yield: 28.5% of the starch.
(d) Corn mash fermentation:
   Medium used: corn meal 70 grams per liter.
   Yield range: .8–2.0% of the starch.
   Average yield: 1.1% of the starch.
(e) Molasses fermentation:
   Butyl alcohol ratio, 69–76.
   Acetone ratio, 18–25.
   Ethyl ratio, 2.0–7.0.

The bacteria of the present invention may be isolated from corn husks by conventional methods well-known in the art and heretofore widely used in conjunction with the isolation of butanol-acetone producing bacteria.

An outstanding characteristic of my newly-discovered and isolated organism, from a commercial standpoint, is its ability to produce a high butanol ratio along with a correspondingly low acetone ratio.

Thus, on a normal invert molasses mash, the acetone ratio is usually under 20% of the total solvents produced while the butanol ratio is substantially over 70% of the total solvents produced.

The addition of distillation slop, the use of ammonia, the substitution of other types of carbohydrates, all of which have been suggested in the past and which are advantageous from other standpoints, while increasing the acetone ratio, still do not raise the acetone appreciably above 25% of the total solvents produced. This compares extremely favorably with substantially higher acetone ratios obtained when these modifications are used with other organisms heretofore employed.

Since butanol sells at a much higher price than acetone, it is apparent that my novel process for fermenting carbohydrates using the newly-discovered and isolated organism described above has important commercial advantages over the processes of the prior art.

The following are illustrative examples of fermentations carried out with *Clostridium saccharo acetoperbutylicum:*

Example 1

Cuban invert molasses was used to form an aqueous mash having a total sugar concentration of about 6%, calculated as invert sugar. To approximately 1000 parts of the mash were added approximately 3 parts of ammonium sulphate, approximately 3.6 parts of calcium carbonate, and approximately 0.54 part of calcium acid phosphate. The mash was then inoculated with approximately 3 percent of an active culture of *Clostridium saccharo acetoperbutylicum* and incubated at approximately 30° C. for approximately 58 hours. The solvent yield was 29.6% of the sugar employed and the solvent ratio was 75.6% butanol, 22.4% acetone and 2.0% ethyl alcohol.

Example 2

One thousand parts of an aqueous mash containing 60 parts of sugar (calculated as invert sugar) in the form of Cuban invert molasses, and containing approximately 0.54 part of calcium acid phosphate was inoculated with 3% of an active culture of *Clostridium saccharo acetoperbutylicum* and was incubated at approximately 30° C. for 58 hours. Ammonia was used to adjust the starting pH to 6.0. When the fermentation had progressed to a point where the pH dropped to approximately 5.5, further additions of ammonia were made every two hours until the 22nd hour was reached. The total ammonia added was equivalent to 1.4% (figured as $NH_3$) of the weight of sugar in the mash. The total solvent yield was 30.0% of the sugar employed while the solvent ratio was 73.7% butyl alcohol, 19.5% acetone and 6.8% ethyl alcohol.

Example 3

Cuban blackstrap molasses was used to form an aqueous mash containing 6% of sugar calculated as invert sugar. This mash was inoculated with an active culture of *Clostridium saccharo acetoperbutylicum* and was incubated at approximately 30° C. for approximately 48 hours. At the time of inoculation, ammonia was added to the mash in an amount sufficient to adjust the pH to 6.0. When the fermentation had progressed to a point at which the pH had dropped to approximately 5.5, further additions of ammonia were made every two hours until the 22nd hour was reached—the total ammonia added being approximately 1.4% (calculated as $NH_3$) of the weight of sugar in the mash. The total solvent yield was 31.2% of the sugar employed while the solvent ratio was 69.5% butyl alcohol, 24.9% acetone and 5.6% ethyl alcohol.

Example 4

An aqueous mash, containing 60 grams of sugar (calculated as invert sugar) in the form of Cuban invert molasses per liter and containing 30% by volume of distillation slop from a molasses butanol fermentation, was inoculated with an active culture of *Clostridium saccharo acetoperbutylicum* and incubated at 30° C. for 36 hours. The initial pH was adjusted to 6.0 using ammonia and, after the fermentation had progressed to a point at which the pH had dropped to 5.5, further additions of ammonia were made every two hours until the 22nd hour was reached—approximately 1.4% of ammonia (calculated at $NH_3$), based on the weight of sugar, being added. The total solvent yield was approximately 30.4% of the sugar employed while the solvent ratio was 71.9% butanol, 21.5% acetone and 6.6% ethyl alcohol.

Example 5

The procedure of Example 1 was repeated with an aqueous mash containing 50 grams of soluble starch, 5 grams of peptone, 3 grams of beef extract, one gram of ammonium sulphate, and 4 grams of calcium carbonate per liter. The solvent yield was 28% of the carbohydrate employed while the solvent ratio was approximately the same as that obtained in Example 1.

Example 6

The procedure of Example 1 was repeated with an aqueous mash containing approximately 70 grams of corn mash, 3 grams of ammonium sulphate and 4 grams of calcium carbonate per liter. The solvent yield based on the starch and the solvent ratio were approximately the same as those obtained in Example 1.

The carbohydrate concentration of the mash fermented according to the process of the present invention may be as high as 7% or even more. However, if the sugar or starch source is deficient in suitable degraded protein, it is desirable to add soluble nitrogen in the form of ammonia or its salts, or its organic derivaties, including urea, corn steep water or other sources of degraded protein.

If the raw material is deficient in buffering materials, steps should be taken to keep the pH of the mash from falling substantially below 5.5 during fermentation. This can be done by gradually adding alkaline neutralizing agents, such as alkali or alkaline earth oxides, hydroxides or carbonates, or alkaline ammonium compounds, in suitable amount and at suitable rates. The amount so added should not raise the pH appreciably above 6.0 nor should it be more than is necessary to prevent the pH from falling substantially below 5.5. The amount required can readily be determined by experiment for each type of raw material and neutralizing agent.

The fermentation may be carried out between about 28 and 35° C. for about 40 to 72 hours.

About 2 to 4% of inoculum is used in the fermentation. The inoculum may contain, in addition to the carbohydrate medium, assimilable nitrogen and other nutrients as required and may be adjusted to a pH of about 5.5 to 6.0.

The organism described hereinabove is capable of fermenting such sugary mashes as blackstrap molasses, invert molasses (from cane sugar and other sources), cane sugar, beet sugar or beet molasses, hydrolyzed carbohydrates such as dextrine, inulin and syrups, and other industrial sources of sugar.

The organism is capable of fermenting such cereal grains as corn, wheat, oats, rye, barley, etc. in the presence of suitable forms of degraded protein.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what I claim as new and desire to protect by Letters Patent is:

1. A process for producing organic solvents having relatively high proportions of butanol which comprises forming an aqueous mash containing a fermentable carbohydrate and containing suitable bacterial nutrients, adjusting the pH to approximately 6.0, inoculating the mash with a bacterial culture containing *Clostridium saccharo acetoperbutylicum* and incubating said inoculated mash at a temperature of about 28 to 35° C. for about 40 to 72 hours, while adding alkali from time to time to maintain the pH at approximately 5.5 to 6.5.

2. A process for producing organic solvents having relatively high proportions of butanol which comprises forming an aqueous mash containing a fermentable sugar and containing suitable bacterial nutrients, inoculating said mash with a bacterial culture containing *Clostridium saccharo acetoperbutylicum* and incubating the inoculated mash at approximately 28 to 35° C. for about 40 to 72 hours while maintaining its pH between about 5.0 and 7.0, thereby to bring about substantially complete fermentation of said mash.

3. A process for producing organic solvents having relatively high proportions of butanol which comprises forming an aqueous mash containing a fermentable cereal starch and containing suitable bacterial nutrients, inoculating said mash with a bacterial culture containing *Clostridium saccharo acetoperbutylicum* and incubating the inoculated mash at approximately 28 to 35° for about 40 to 72 hours while maintaining its pH between about 5.0 and 7.0, thereby to bring about substantially complete fermentation of said mash.

4. A process for producing organic solvents having relatively high proportions of butanol which comprises forming an aqueous mash containing a fermentable carbohydrate and containing suitable bacterial nutrients, inoculating said mash with a bacterial culture containing *Clostridium saccharo acetoperbutylicum*, and incubating the inoculated mash at approximately 28 to 35° C. for about 40 to 72 hours while maintaining its pH between about 5.0 and 7.0, thereby to bring about substantially complete fermentation of said mash.

SAMUEL C. BEESCH.

REFERENCES CITED

The following references are of record in the file of this patent:

UNITED STATES PATENTS

| Number | Name | Date |
| --- | --- | --- |
| 2,110,109 | McCoy | Mar. 1, 1938 |
| 2,139,111 | Carnarius | Dec. 6, 1938 |
| 2,132,039 | Muller | Oct. 4, 1938 |
| 2,139,108 | Arzberger | Dec. 6, 1938 |
| 2,198,104 | Carnarius | Apr. 23, 1940 |
| 2,113,471 | Arroya | Apr. 5, 1938 |
| 2,113,472 | Arroya | Apr. 5, 1938 |